United States Patent
Hu et al.

(10) Patent No.: US 12,374,018 B2
(45) Date of Patent: Jul. 29, 2025

(54) METHOD AND APPARATUS FOR DISPLAYING VIRTUAL CHARACTER, DEVICE, AND STORAGE MEDIUM

(71) Applicant: TENCENT TECHNOLOGY (SHENZHEN) COMPANY LIMITED, Shenzhen (CN)

(72) Inventors: Xiaochen Hu, Shenzhen (CN); Jiacheng Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/647,555

(22) Filed: Apr. 26, 2024

(65) Prior Publication Data

US 2024/0296613 A1 Sep. 5, 2024

Related U.S. Application Data

(63) Continuation of application No. 17/883,381, filed on Aug. 8, 2022, now Pat. No. 12,020,360, which is a (Continued)

(30) Foreign Application Priority Data

Oct. 22, 2020 (CN) .......................... 202011140776.5

(51) Int. Cl.
   *G06T 13/40* (2011.01)
   *A63F 13/69* (2014.01)
(52) U.S. Cl.
   CPC .............. *G06T 13/40* (2013.01); *A63F 13/69* (2014.09); *A63F 2300/5553* (2013.01)
(58) Field of Classification Search
   CPC .......... A63F 13/69; G06T 13/40; G06T 19/20
   See application file for complete search history.

(56) References Cited

U.S. PATENT DOCUMENTS

| 11,308,687 B1 | 4/2022 | Liang et al. |
| 2006/0217008 A1 | 9/2006 | Higashino et al. |

(Continued)

FOREIGN PATENT DOCUMENTS

| CN | 107833092 A | 3/2018 |
| CN | 108734758 A | 11/2018 |

(Continued)

OTHER PUBLICATIONS

The World Intellectual Property Organization (WIPO) International Search Report for PCT/CN2021/122676 Jan. 6, 2022 6 pages (including translation).

(Continued)

*Primary Examiner* — Charles Tseng
(74) *Attorney, Agent, or Firm* — ANOVA LAW GROUP PLLC

(57) ABSTRACT

A method for displaying a virtual character includes: displaying the virtual character, a first character part on the virtual character including a first clothes component and a first body component that are associated with each other; obtaining a second clothes component in response to a clothes component replacement instruction, the first clothes component and the second clothes component being corresponding to a same clothes part; updating display to perform a clothes component replacement, the first character part on the virtual character including the second clothes component and a second body component that are associated with each other. The first clothes component is different from the second clothes component in length, the first body component is different from the second body component in length, and a length of the first character part remains unchanged or changes by a value less than a threshold.

20 Claims, 11 Drawing Sheets

Related U.S. Application Data continuation of application No. PCT/CN2021/122676, filed on Oct. 8, 2021.

(56) References Cited

U.S. PATENT DOCUMENTS

| | | |
|---|---|---|
| 2012/0223952 A1 | 9/2012 | Kanemaru et al. |
| 2016/0027200 A1 | 1/2016 | Corazza et al. |
| 2017/0287060 A1 | 10/2017 | Choi et al. |
| 2019/0192967 A1 | 6/2019 | Ogasawara et al. |

FOREIGN PATENT DOCUMENTS

| | | |
|---|---|---|
| CN | 110136228 A | 8/2019 |
| CN | 110681157 A | 1/2020 |
| CN | 111420399 A | 7/2020 |
| CN | 112156465 A | 1/2021 |
| JP | 2006268406 A | 10/2006 |

OTHER PUBLICATIONS

The State Intellectual Property Office of the People's Republic of China (SIPO) Office Action 1 for 202011140776.5 Oct. 11, 2021 13 pages (including translation).

Gorgeous Stave, ""Little Xinxin" qq flying car changed into new clothes, start fighting. Game," Kankan Video Baidu, Feb. 22, 2020, Retrieved from the Internet:URL: https://haokan.baidu.com/v?pd=wisenatural&vid=11849230986035686526. 1 page.

Big Talk About the Game, "Thrilling the battlefield: heroine-level characters," Kankan Video Baidu, Nov. 28, 2019, Retrieved from the Internet:URL: https://haokan.baidu.com/v?PD=wisenatural&vid=13203396340937861632. 1 page.

Hauswiesner et al., Image-Based Clothes Transfer, IEEE International Symposium on Mixed and Augmented Reality 2011 Science and Technology Proceedings, Oct. 2011, pp. 169-172 (Year: 2011).

Korean Intellectual Property Office (KIPO) Office Action 1 for Application No. 2022-7040808 Aug. 6, 2024 17 Pages (including translation).

| Display the virtual character, a first character part on the virtual character including a third clothes component and a multi-style component, and the multi-style component being displayed as a first style | 502 |

↓

| Obtain a fourth clothes component in response to a clothes component replacement instruction, a model intersection existing between the fourth clothes component and the multi-style component of the first style | 504 |

↓

| Update display of the virtual character, the second character part of the virtual character including the fourth clothes component and the multi-style component, the multi-style component being displayed as a second style, and no model intersection existing between the fourth clothes component and the multi-style component of the second style | 506 |

FIG. 10

METHOD AND APPARATUS FOR DISPLAYING VIRTUAL CHARACTER, DEVICE, AND STORAGE MEDIUM

CROSS-REFERENCES TO RELATED APPLICATIONS

This application is a continuation of U.S. application Ser. No. 17/883,381 filed on Aug. 8, 2022; U.S. application Ser. No. 17/883,381 is a continuation application of PCT Patent Application No. PCT/CN2021/122676, entitled "VIRTUAL CHARACTER DISPLAY METHOD AND APPARATUS, AND DEVICE, MEDIUM AND PROGRAM PRODUCT" and filed on Oct. 8, 2021, which claims priority to Chinese Patent Application No. 202011140776.5, filed on Oct. 22, 2020 and entitled "METHOD AND APPARATUS FOR DISPLAYING VIRTUAL CHARACTER, DEVICE, AND MEDIUM", the entire contents of all of which are incorporated herein by reference.

FIELD OF THE TECHNOLOGY

Embodiments of the present disclosure relate to the field of virtual environments, and in particular, to a method and apparatus for displaying a virtual character, a device, a medium, and a program product.

BACKGROUND OF THE DISCLOSURE

A battle game is a game in which a plurality of user accounts compete in the same scene.

A user may control a virtual character to carry out a game battle in the battle game. The virtual character may wear different clothes. In the related art, the same virtual character may correspond to multiple sets of clothes. When a user has two or more sets of clothes, the corresponding virtual character may wear a set of clothes 1 or a set of clothes 2, that is, the corresponding virtual character may switch between the set of clothes 1 and the set of clothes 2.

If a whole set of clothes is divided into a plurality of components, different components from different sets of clothes cannot be matched, resulting in clipping. Clipping refers to a display error phenomenon caused by the intersection of different three-dimensional models.

SUMMARY

Embodiments of the present disclosure provide a method and apparatus for displaying a virtual character, a device, a medium, and a program product. The technical solutions are as follows.

According to an aspect, a method for displaying a virtual character is provided, applied to a terminal, the virtual character being a three-dimensional virtual character based on a three-dimensional model, and the method including: displaying the virtual character, a first character part on the virtual character including a first clothes component and a first body component; obtaining a second clothes component in response to a clothes component replacement instruction, the first clothes component and the second clothes component being corresponding to a same clothes part, and a length of the first clothes component being different from a length of the second clothes component; and updating display to perform a clothes component replacement, the first character part on the virtual character including the second clothes component and a second body component, and a length of the second body component being different from a length of the first body component, wherein a length of the first character part remains unchanged or changes by a value less than a threshold upon completion of the clothes component replacement.

According to another aspect, an apparatus for displaying a virtual character is provided, the virtual character being a three-dimensional virtual character based on a three-dimensional model, and the apparatus including: a display module, configured to display the virtual character, a first character part on the virtual character including a first clothes component and a first body component; an interaction module, configured to obtain a second clothes component in response to a clothes component replacement instruction, the first clothes component and the second clothes component being corresponding to a same clothes part, and a length of the first clothes component being different from a length of the second clothes component; and the display module, configured to update display to perform a clothes component replacement, the first character part on the virtual character including the second clothes component and a second body component, and a length of the second body component being different from a length of the first body component, wherein a length of the first character part remains unchanged or changes by a value less than a threshold upon completion of the clothes component replacement.

According to another aspect, a computer device is provided, including a processor and a memory, the memory storing at least one instruction, at least one program, a code set, or an instruction set, the at least one instruction, the at least one program, the code set, or the instruction set being loaded and executed by the processor to implement the method for displaying a virtual character described in the foregoing aspects.

According to another aspect, a non-transitory computer-readable storage medium is provided, storing at least one instruction, at least one program, a code set, or an instruction set, the at least one instruction, the at least one program, the code set, or the instruction set being loaded and executed by a processor to implement the method for displaying a virtual character described in the foregoing aspects.

The technical solutions provided in the embodiments of the present disclosure have at least the following beneficial effects:

When the first clothes component is replaced with the second clothes component, if the first clothes component and the second clothes component are different in length, the second clothes component associated with the first clothes component is automatically replaced with the first clothes component, so that the length of the first character part remains unchanged or changes by a value less than a threshold upon completion of the clothes component replacement, which can keep the appearance of the entire virtual character in proper proportion and avoid mismatch caused by suddenly big and then small proportions.

BRIEF DESCRIPTION OF THE DRAWINGS

FIG. 10 is a flowchart of a method for displaying a virtual character according to an exemplary embodiment of the present disclosure.

DESCRIPTION OF EMBODIMENTS

Figure 1:
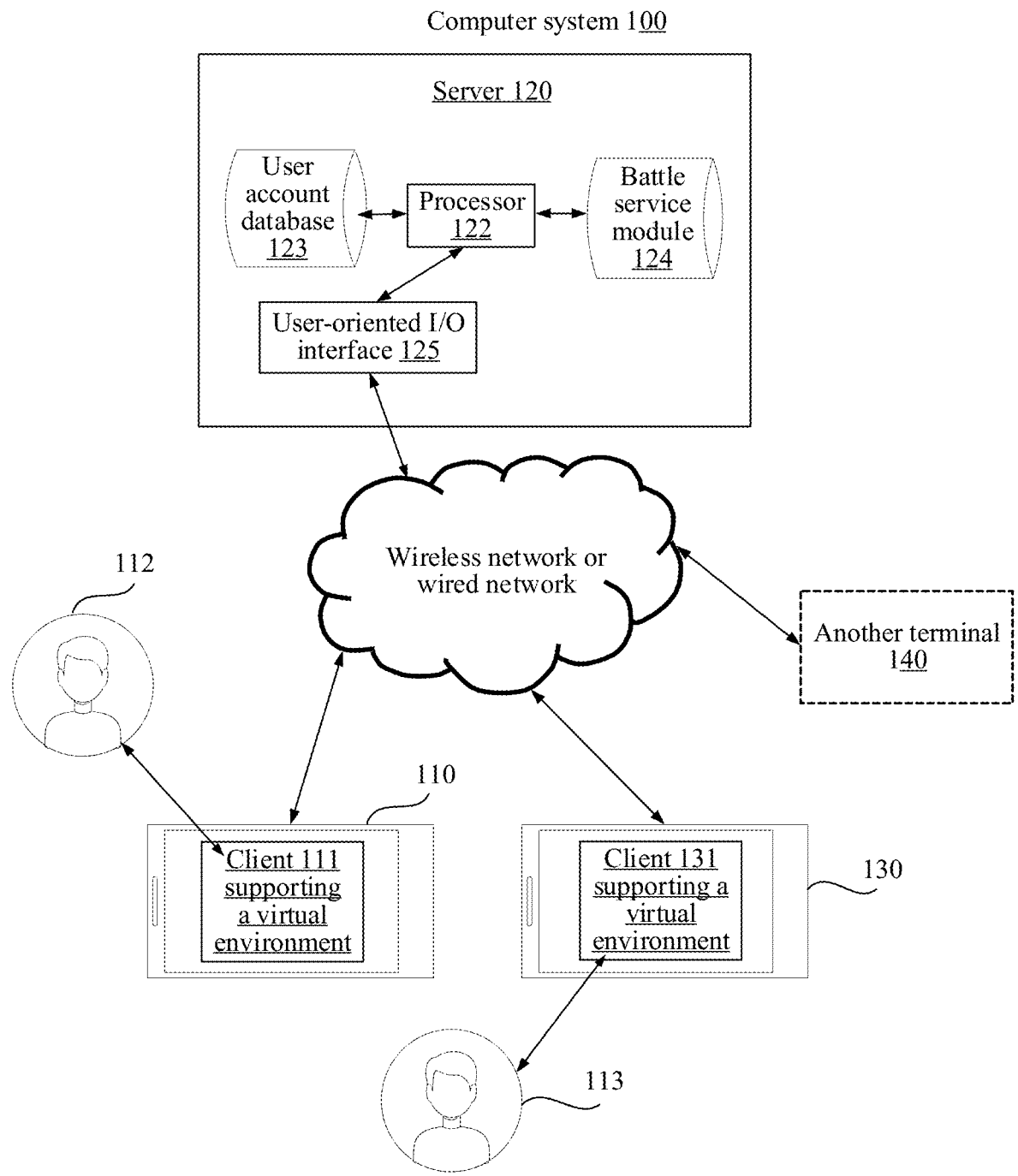
FIG. 1 is a structural block diagram of a computer system according to an exemplary embodiment of the present disclosure.

First, terms involved in the embodiments of the present disclosure are briefly introduced.

A virtual environment is a virtual environment displayed (or provided) by an application when running on a terminal. The virtual environment may be a simulated world of a real world, or may be a semi-simulated semi-fictional three-dimensional world, or may be an entirely fictional three-dimensional world. The virtual environment may be any one of a two-dimensional virtual environment, a 2.5-dimensional virtual environment, and a three-dimensional virtual environment. In some embodiments, the virtual environment is further used for a virtual environment battle between at least two virtual characters, and there are virtual resources available to the at least two virtual characters in the virtual environment. In some embodiments, the virtual environment includes a lower left corner region and an upper right corner region that are symmetrical. Virtual characters belonging to two opposing camps occupy the regions respectively, and the objective of each camp is to destroy a target building/fort/base/crystal deep in the opponent's region to win victory.

A virtual character is an immovable object or a movable object in a virtual environment. The movable object may be at least one of a virtual character, a virtual animal, and an animation character. The immovable object may be at least one of a virtual building, a virtual plant, and a virtual terrain. In some embodiments, when the virtual environment is a three-dimensional virtual environment, the virtual character may be a three-dimensional virtual model. Each virtual character has a shape and a volume in the three-dimensional virtual environment, and occupies some space in the three-dimensional virtual environment. In some embodiments, the virtual character is a three-dimensional character constructed based on three-dimensional human skeleton technology. The virtual character wears different skins to implement different appearances. In some implementations, the virtual character may be alternatively implemented by using a 2.5-dimensional model or a two-dimensional model. This is not limited in the embodiments of the present disclosure.

A multiplayer online battle arena (MOBA) is an arena in which different virtual teams on at least two opposing camps occupy respective map regions in a virtual environment, and compete against each other using a specific victory condition as a goal. The victory condition includes, but is not limited to, at least one of the following: occupying forts or destroying forts of the opposing camp, killing virtual characters in the opposing camp, ensuring own survivals in a specified scene and time, seizing a specific resource, or outscoring the opponent within a specified time. The battle arena game may take place in rounds. The same map or different maps may be used in different rounds of the battle arena game. Each virtual team includes one or more virtual characters, for example, 1 virtual character, 2 virtual characters, 3 virtual characters, or 5 virtual characters.

A user interface (UI) control is any visible or invisible control or element in a UI of an application, such as a picture, an input box, a text box, a button, or a label. For example, when the UI control is an invisible control, a user may trigger a specified region in the UI to trigger the invisible control. Some UI controls respond to an operation of a user, for example, a skill control controls a master virtual character to cast the skill. The user triggers the skill control to control the master virtual character to cast the skill. UI controls involved in the embodiments of the present disclosure include, but are not limited to: a skill control, a movement control, and a camera movement control.

A clothes component is a part of components constituting a whole set of clothes model, belonging to a three-dimensional model of a part type or a three-dimensional model of a component type. The clothes component is also referred to as an avatar component. A whole set of clothes model includes at least two clothes components, for example, at least one of a hat component, a top component, a bottom component, a glove component, a shoe component, a weapon component, and a decorative component.

FIG. 1 is a structural block diagram of a computer system according to an exemplary embodiment of the present disclosure. The computer system 100 includes a first terminal 110, a server 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client may be any one of a military simulation program, an escape shooting game, a virtual reality (VR) application, an augmented reality (AR) program, a three-dimensional map program, a VR game, an AR game, a first-person shooting (FPS) game, a third-person shooting (TPS) game, a MOBA game, and a simulation game (SLG). The first terminal 110 is a terminal used by a first user 112. In a game battle, the first user 112 uses the first terminal 110 to control a first virtual character located in the virtual environment to perform activities. The first virtual character may be referred to as a master virtual character of the first user 112 in the game battle. The activities of the first virtual character include, but are not limited to: at least one of adjusting body postures, crawling, walking, running, riding, flying, jumping, driving, picking, shooting, attacking, and throwing. Outside a game battle, the first user 112 uses the first terminal 110 to play a first role to perform activities outside the game battle, such as joining a team, joining a guild, adding a friend, purchasing a prop, purchasing a virtual character, completing a mission, and sending a mail.

A client 131 supporting a virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, an escape shooting game, a VR application, an AR program, a three-dimensional map program, a VR game, an AR game, an FPS game, a TPS game, a MOBA game, and an SLG. The second terminal 130 is a terminal used by a second user 113. In a game battle, the second user 113 uses the second terminal 130 to control a second virtual character located in the virtual environment to perform activities. The second virtual character may be referred to as a master virtual character of the second user 113 in the game battle. Outside a game battle, the second user 113 uses the second terminal 130 to play a second role to perform activities outside the game battle, such as joining a team, joining a guild, adding a friend, purchasing a prop, purchasing a virtual character, completing a mission, and sending a mail.

In some embodiments, in a game battle, the first virtual character and the second virtual character are located in the same virtual environment. In some embodiments, the first virtual character and the second virtual character may belong to the same camp, the same team, or the same organization, or have a temporary communication permission. In some embodiments, the first virtual character and the second virtual character may belong to different camps, different teams, or different organizations, or have an adversarial relationship with each other.

In some embodiments, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer.

FIG. 1 shows only two terminals. However, a plurality of other terminals 140 may access the server 120 in different embodiments. In some embodiments, one or more terminals 140 are terminals corresponding to a developer. A developing and editing platform for the client supporting a virtual environment is installed on the terminal 140. The developer may edit and update the client on the terminal 140 and transmit an updated client installation package to the server 120 by using a wired or wireless network. The first terminal 110 and the second terminal 130 may download the client installation package from the server 120 to update the client.

The first terminal 110, the second terminal 130, and the another terminal 140 are connected to the server 120 by a wireless network or a wired network.

The server 120 includes at least one of one server, a plurality of servers, a cloud computing platform, and a virtualization center. The server 120 is configured to provide a background service for a client supporting a three-dimensional virtual environment. In some embodiments, the server 120 is in charge of primary computing, and the terminals are in charge of secondary computing. Alternatively, the server 120 is in charge of secondary computing, and the terminals are in charge of primary computing. Alternatively, the server 120 and the terminals perform collaborative computing based on a distributed computing architecture.

In an exemplary example, the server 120 includes a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and the another terminal 140, for example, profile pictures of the user accounts, nicknames of the user accounts, combat effectiveness indexes of the user accounts, and service zones of the user accounts. The battle service module 124 is configured to provide a plurality of battle rooms for users to battle, for example, a 1V1 battle, a 3V3 battle, and a 5V5 battle. The user-oriented I/O interface 125 is configured to establish communication with the first terminal 110 and/or the second terminal 130 by using a wireless network or a wired network for data exchange.

A method for displaying a virtual character provided by the embodiments of the present disclosure is described with reference to the foregoing description of the virtual environment and the description of an implementation environment. Descriptions are made by using an example in which an execution entity of the method is a client running on a terminal shown in FIG. 1. The client running on the terminal is a client of an application. The application is a program supporting the virtual environment.

Figure 2:
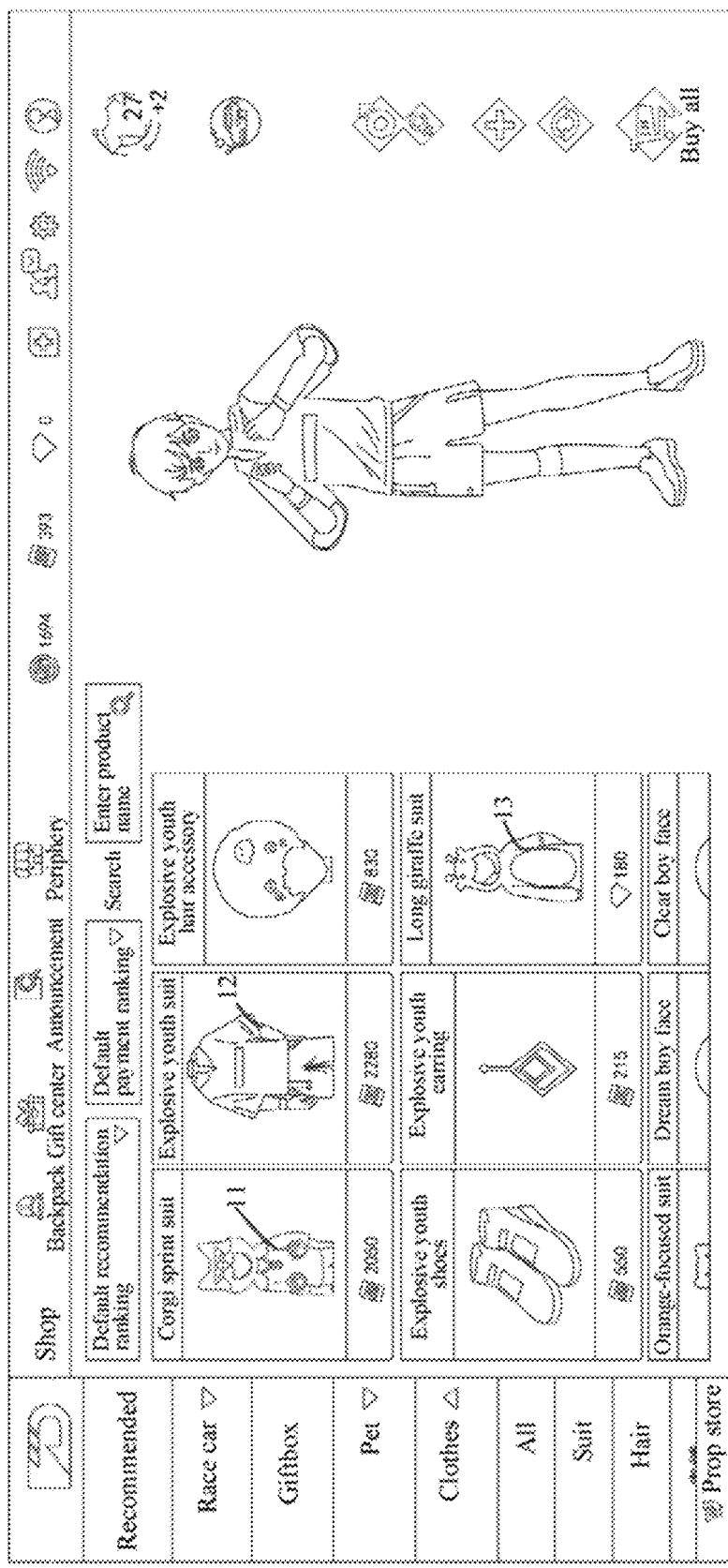
FIG. 2 is a schematic diagram of an interface of a method for displaying a virtual character according to an exemplary embodiment of the present disclosure.

In some shop UI, clothes of a virtual character are usually sold in sets, especially for the parts that are prone to conflict of clipping. For example, in a racing game shown in FIG. 2, clothes of a male virtual character include: a corgi sprint suit 11, an explosive youth suit 12, and a long giraffe suit 13. The same set of clothes usually consists of two or more single clothes components. If clothes components in different sets of clothes are arbitrarily matched and combined, the problem of clipping on display often occurs.

Figure 3:
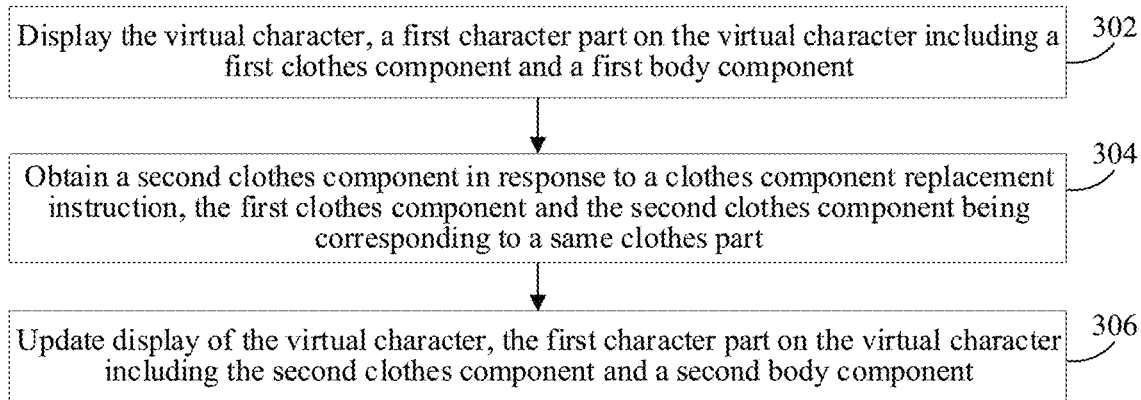
FIG. 3 is a flowchart of a method for displaying a virtual character according to an exemplary embodiment of the present disclosure.

FIG. 3 is a flowchart of a method for displaying a virtual character according to an exemplary embodiment of the present disclosure. The method may be performed by a client running on any terminal in FIG. 1. The client is a client supporting a virtual environment. The method includes the following steps.

Step 302: Display the virtual character, a first character part on the virtual character including a first clothes component and a first body component.

After running, the client displays a UI with various functions, such as a battle UI, a matching UI, a setting application interface, and a clothes-related UI. The clothes-related UI includes: a dressing room UI or a shop UI. The dressing room UI is configured to replace a clothes component of a virtual character with candidate clothes components. These clothes components are clothes components already owned by a user account to which a user logs in on the client. The shop UI is configured to replace a clothes component of a virtual character with clothes components on sale. These clothes components may be clothes components already purchased by a user account or may be clothes components that have not been purchased yet.

Using the dressing room UI as an example, the client displays the dressing room UI, the virtual character is displayed on the dressing room UI, and the virtual character wears at least one clothes component. The first character part on the virtual character includes the first clothes component and the first body component.

The virtual character is a three-dimensional virtual character based on a three-dimensional model. The character part is a part of a trunk or limb on the virtual character. For example, the character part includes at least one of a head, an upper body, a lower body, an arm, and a thigh. A division manner of the character part is not limited in this embodiment.

The clothes component is a part of sub-models in a whole set of clothes model. For example, the clothes component includes at least one of a hat component, a top component, a bottom component, a glove component, a shoe component, a weapon component, and a decorative component. The body component includes at least one of a head component, a trunk component, an upper arm component, a forearm component, a palm component, a thigh component, a calf component, and a foot component. A division manner of the clothes component and the body component is not limited in this embodiment.

In some embodiments, the first clothes component and the first body component are associated with each other. The first clothes component and the first body component associated with each other refers to that the first clothes component and the first body component are connected to each other, or the first clothes component is worn on the first body component, or the first clothes component is mounted on the first body component, or the first clothes component and the first body component are in contact with each other.

A length of the first character part is equal to a sum of lengths of the first clothes component and the first body component, or a length of the first character part is equal to a length of the first body component, or a length of the first character part is less than a sum of lengths of the first clothes component and the first body component. The length of the first character part may represent a body part length (such as, a limb length, a torso length, a length of other body parts like neck, head, etc.) of the first character part.

Figure 4:
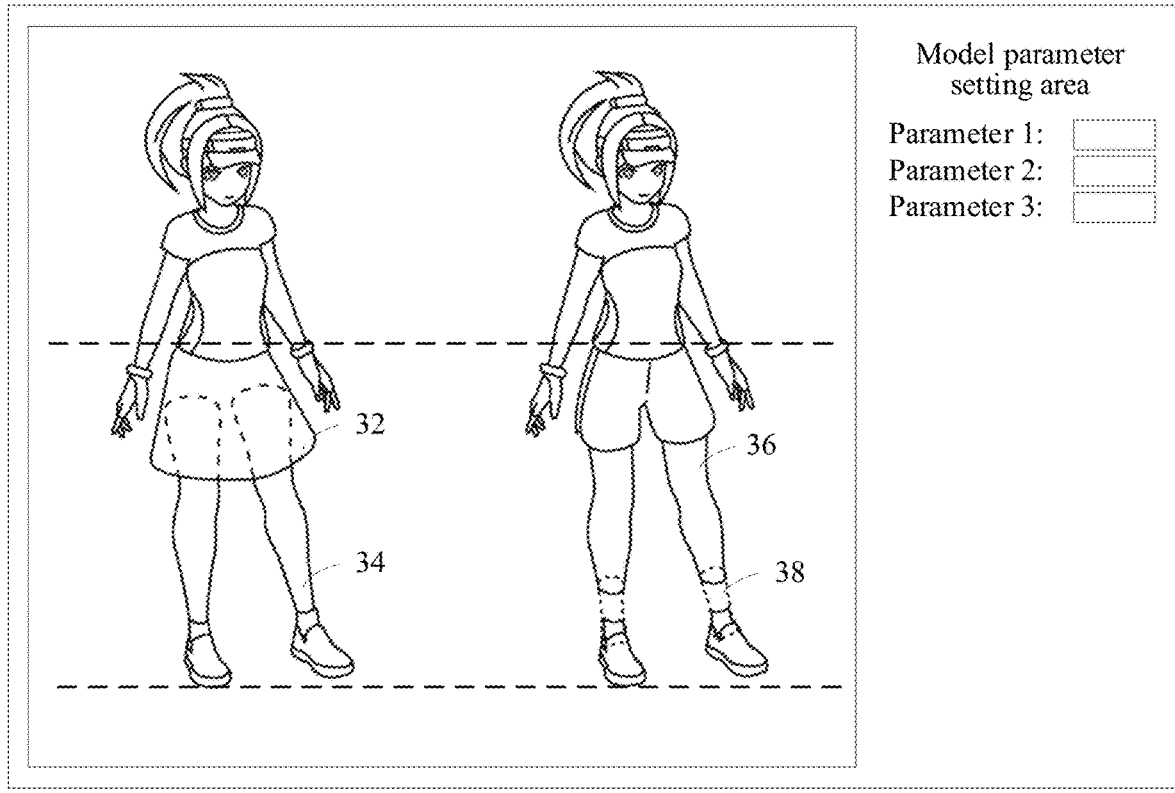
FIG. 4 is a schematic diagram of an interface of a method for displaying a virtual character according to an exemplary embodiment of the present disclosure.

For example, referring to FIG. 4, the first character part is a lower body of the virtual character, the first clothes component is a skirt 32, the first body component is a thigh component 34, and the thigh component 34 refers to a leg exposed below the skirt 32. Because the skirt 32 is worn on the thigh component 34, a length of the lower body of the virtual character is basically equal to a length of the thigh component.

Step 304: Obtain a second clothes component in response to a clothes component replacement instruction, the first clothes component and the second clothes component being corresponding to a same clothes part.

The clothes component replacement operation is an operation used to trigger replacement of the first clothes component. In terms of triggering form, the clothes component replacement operation includes at least one of a touch operation, a pressure touch operation, a floating touch operation, a motion sensing operation, a gesture operation, an eye gaze operation, and a voice control operation. That is, the clothes component replacement operation may be triggered based on a clothes-related UI displayed on a touchscreen, or may be triggered by hardware such as a sensor, a camera, or a microphone.

The clothes component replacement operation may be an operation used to select the second clothes component, or may be an operation used to cancel wearing of the first clothes component.

Step 306: Update display to perform a clothes component replacement, the first character part on the virtual character including the second clothes component and a second body component.

In some embodiments, the second clothes component and the second body component are associated with each other. The second clothes component and the second body component associated with each other refers to that the second clothes component and the second body component are connected to each other, or the second clothes component is worn on the second body component, or the second clothes component is mounted on the second body component, or the second clothes component and the second body component are in contact with each other.

A length of the second character part is equal to a sum of lengths of the second clothes component and the second body component, or a length of the second character part is equal to a length of the second body component, or a length of the second character part is less than a sum of lengths of the second clothes component and the second body component.

The first clothes component is different from the second clothes component in length, the first body component is different from the second body component in length, and a length of the first character part remains unchanged or changes by a value less than a threshold upon completion of the clothes component replacement.

For example, referring to FIG. 4, the first character part is a lower body of the virtual character, the second clothes component is double-layered pants 36 of shorts+three quarter legs, the second body component is a calf component 38, and the calf component 38 refers to a leg exposed below the double-layered pants 36. A length of the lower body of the virtual character is equal to a sum of lengths of the double-layered pants 36 and the calf component 38. In the process of switching from the skirt 32 to the double-layered pants 36, the lower body of the virtual character does not change significantly.

For example, the first clothes component and the second clothes component are from different sets of clothes, that is, the first clothes component and the second clothes component are not from the same set of clothes.

Based on the above, in the method provided in this embodiment, when the first clothes component is replaced with the second clothes component, if the first clothes component and the second clothes component are different in length, the second clothes component associated with the first clothes component is automatically replaced with the first clothes component, so that the length of the first character part remains unchanged or changes by a value less than a threshold, which can keep the appearance of the entire virtual character in proper proportion and avoid mismatch caused by suddenly big and then small proportions.

Figure 5:
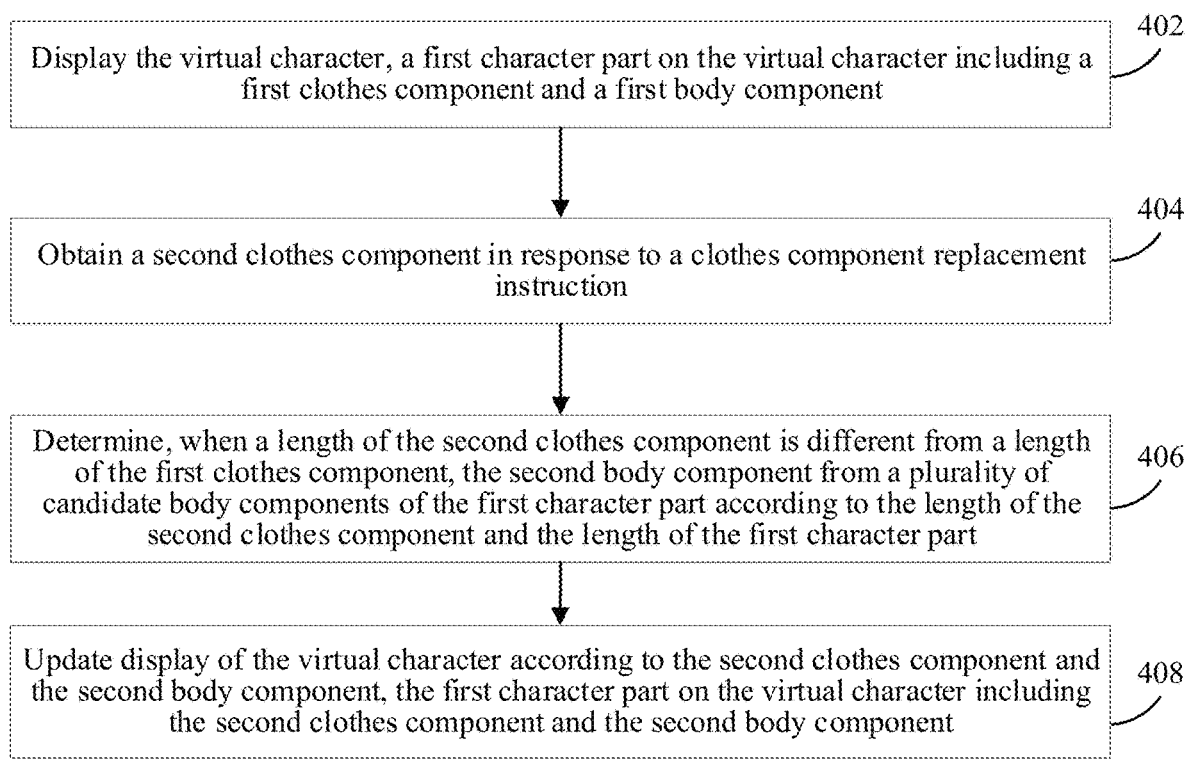
FIG. 5 is a flowchart of a method for displaying a virtual character according to an exemplary embodiment of the present disclosure.

FIG. 5 is a flowchart of a method for displaying a virtual character according to another exemplary embodiment of the present disclosure. The method may be performed by a client running on any terminal in FIG. 1. The client is a client supporting a virtual environment. The method includes the following steps.

Step 402: Display the virtual character, a first character part on the virtual character including a first clothes component and a first body component.

The client displays a clothes-related UI such as a dressing room UI or a shop UI. The virtual character is displayed on the dressing room UI or the shop UI, and the virtual character wears at least one clothes component. The first character part on the virtual character includes the first clothes component and the first body component that are associated with each other.

The virtual character is a three-dimensional virtual character based on a three-dimensional model. The character part is a part of a trunk or limb on the virtual character. For example, the character part includes at least one of a head, an upper body, a lower body, an arm, and a thigh. A division manner of the character part is not limited in this embodiment.

The clothes component is a part of sub-models in a whole set of clothes model. For example, the clothes component includes at least one of a hat component, a top component, a bottom component, a glove component, a shoe component, a weapon component, and a decorative component. The body component includes at least one of a head component, a body component, an upper arm component, a forearm component, a palm component, a thigh component, a calf component, and a foot component. A division manner of the clothes component and the body component is not limited in this embodiment.

The first clothes component and the first body component associated with each other refers to that the first clothes component and the first body component are connected to each other, or the first clothes component is worn on the first body component, or the first clothes component is mounted on the first body component, or the first clothes component and the first body component are in contact with each other.

A length of the first character part is equal to a sum of lengths of the first clothes component and the first body component, or a length of the first character part is equal to a length of the first body component, or a length of the first character part is less than a sum of lengths of the first clothes component and the first body component.

Step 404: Obtain a second clothes component in response to a clothes component replacement instruction.

Figure 6:
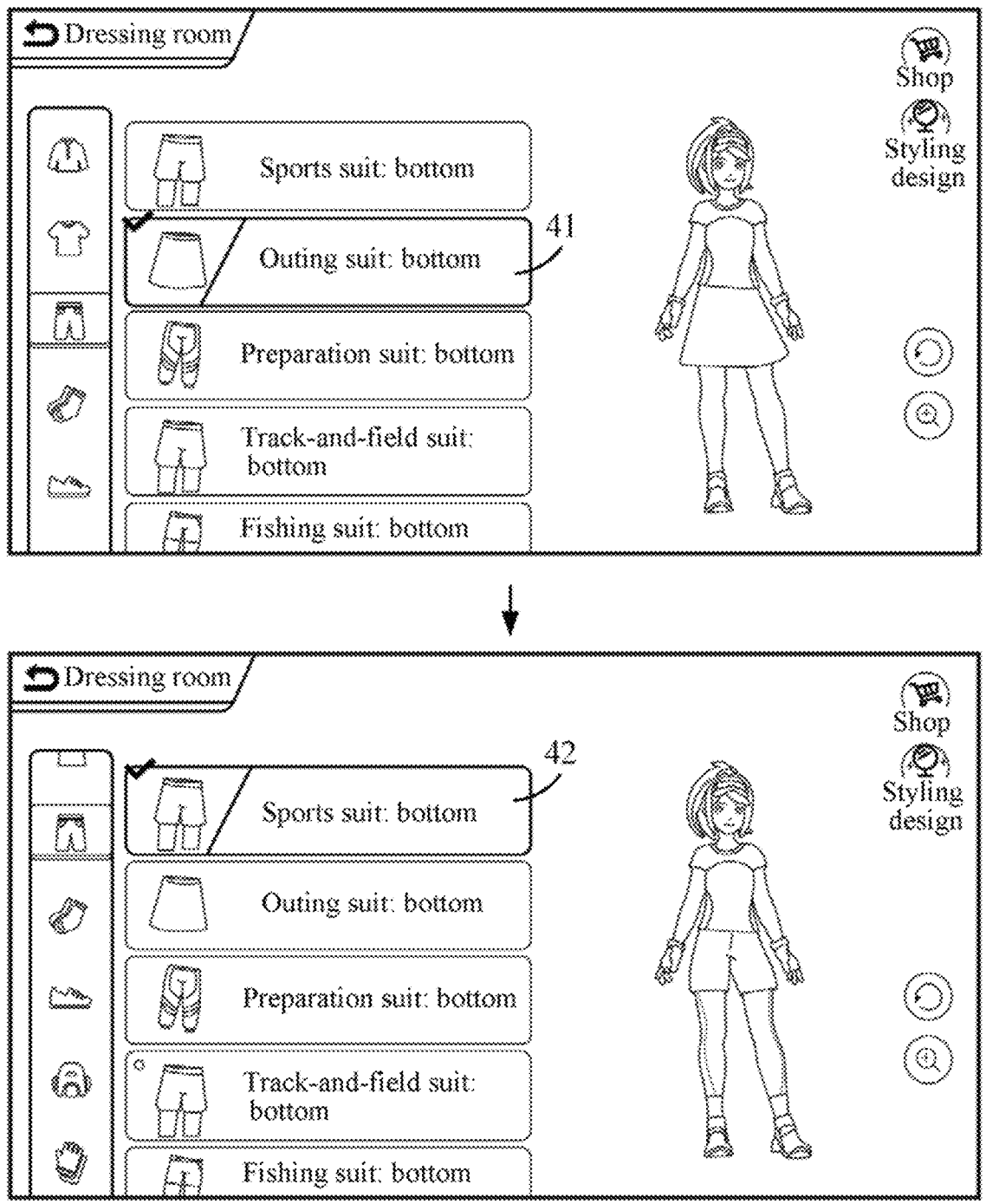
FIG. 6 is a schematic diagram of an interface of a method for displaying a virtual character according to an exemplary embodiment of the present disclosure.

In an example, as shown in FIG. 6, the clothes-related UI is the dressing room UI. The virtual character wears an outing suit 41. In addition to the virtual character, the dressing room UI also displays a plurality of candidate clothes components: a sports suit, a preparation suit, a track-and-field suit, and a fishing suit. The clothes component replacement operation includes a selection operation triggered on a candidate clothes component from a plurality of candidate clothes components on the clothes-related UI. For example, the selection operation is a click/tap operation of selecting a sports suit 42.

In response to a selection operation on candidate clothes components, the client obtains a selected clothes component as the second clothes component.

Figure 7:
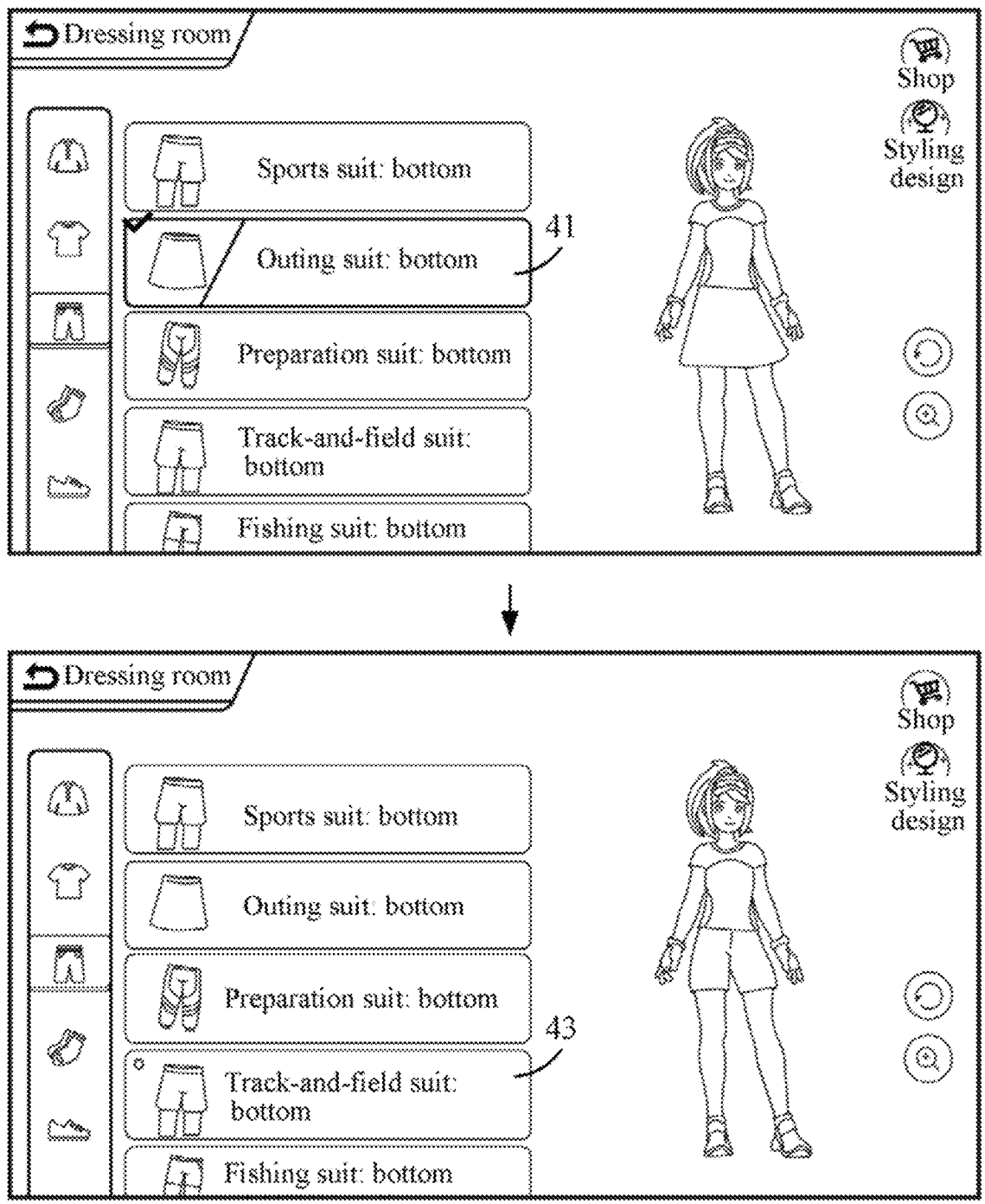
FIG. 7 is a schematic diagram of an interface of a method for displaying a virtual character according to an exemplary embodiment of the present disclosure.

In another example, as shown in FIG. 7, the first clothes component is an additional clothes component purchased or gifted by the user account except for a default clothes component. The clothes-related UI is the dressing room UI. Assuming that a track-and-field suit 43 is the default clothes component, the virtual character wears the outing suit 41. The clothes component replacement operation may be an operation of canceling wearing of the first clothes component, for example, a click/tap operation on the outing suit 41 that has already been worn. In response to a wearing cancel operation on the first clothes component, the client obtains a default clothes component: the track-and-field suit 43 as the second clothes component.

For example, the first clothes component and the second clothes component correspond to the same clothes part, for example, both the first clothes component and the second clothes component are tops, or both are bottoms.

Step 406: Determine, when a length of the second clothes component is different from a length of the first clothes component, the second body component from a plurality of candidate body components of the first character part according to the length of the second clothes component and the length of the first character part.

When the second clothes component and the first clothes component are different in length, a total length of the second clothes component and the first body component after matching may be excessively large or excessively small.

For example, an association manner of the clothes component and the body component includes, but is not limited to, at least one of a wearing manner and a splicing manner. The wearing manner refers to that the clothes component is worn on the body component. A total length of the clothes component and the body component after matching is mainly related to a length of the body component. For example, a short skirt component is worn on a thigh component, and a length of a lower body is basically equal to a length of the thigh component. The splicing manner refers to that the clothes component and the body component are spliced end to end. A total length of the clothes component and the body component after matching is related to lengths of the clothes component and the body component.

When a total length of the second clothes component and the first clothes component after matching is excessively large or excessively small, the client determines the second body component from the plurality of candidate body components of the first character part according to the length of the second clothes component and the length of the first character part. Alternatively, when the association manner of the second clothes component and the body component is the splicing manner, the client determines the second body component from the plurality of candidate body components of the first character part according to the length of the second clothes component and the length of the first character part.

For example, the plurality of candidate body components of the first character part are pre-stored in the client.

The first clothes component is different from the second clothes component in length, and the first body component is different from the second body component in length. A body part length obtained after the second clothes component and the second body component are matched remains unchanged or changes by a value less than a threshold. That is, the length of the first character part remains unchanged or changes by a value less than a threshold.

For example, the client determines a difference between the length of the first character part and the length of the second clothes component; and determines the second body component having a length closest to the difference from the plurality of candidate body components of the first character part.

For example, the foregoing process of determining the second body component may be performed by a client, or may be performed by a server, or may be performed by a client and a server in a cooperative manner. This is not limited in this embodiment.

Step 408: Update display to perform a clothes component replacement according to the second clothes component and the second body component, the first character part on the virtual character including the second clothes component and the second body component.

Figure 8:
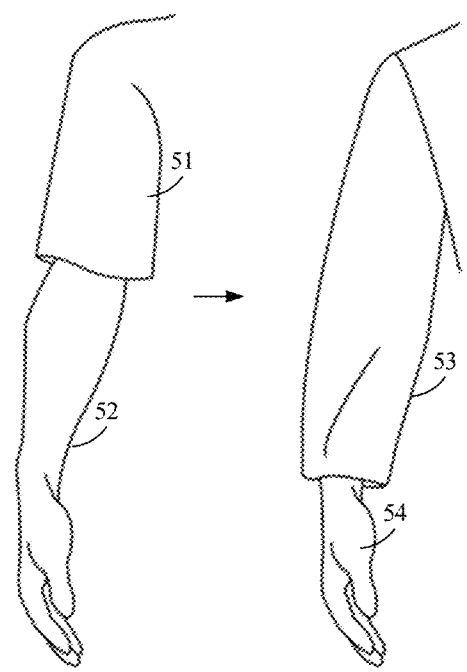
FIG. 8 is a schematic diagram of matching of clothes components according to another exemplary embodiment of the present disclosure.

In one embodiment, as shown in FIG. 8, the first clothes component is a short-sleeve top component 51, the first body component is an upper arm component 52, the second clothes component is a long-sleeve top component 53, and the second body component is a forearm component 54. Alternatively, the first clothes component is a long-sleeve top component, the first body component is a forearm component, the second clothes component is a short-sleeve top component, and the second body component is an upper arm component.

Figure 9:
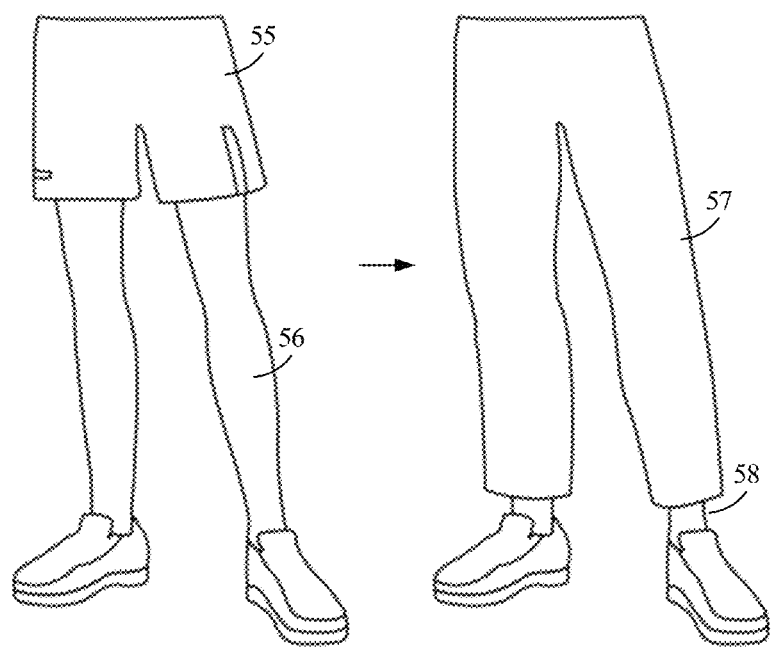
FIG. 9 is a schematic diagram of matching of clothes components according to another exemplary embodiment of the present disclosure.

In one embodiment, as shown in FIG. 9, the first clothes component is a shorts or short skirt bottom component 55, the first body component is a thigh component 56, the second clothes component is a pants or long skirt component 57, and the second body component is a calf component 58. Alternatively, the first clothes component is a pants or long skirt component, the first body component is a calf component, the second clothes component is a shorts or short skirt bottom component, and the second body component is a thigh component.

Based on the above, in the method provided in this embodiment, when the first clothes component is replaced with the second clothes component, if the first clothes component and the second clothes component are different in length, the second clothes component associated with the first clothes component is automatically replaced with the first clothes component, so that the length of the first character part remains unchanged or changes by a value less than a threshold, which can keep the appearance of the entire virtual character in proper proportion and avoid mismatch caused by suddenly big and then small proportions.

FIG. 10 is a flowchart of a method for displaying a virtual character according to another exemplary embodiment of the present disclosure. The method may be performed by a client running on any terminal in FIG. 1. The client is a client supporting a virtual environment. The method includes the following steps.

Step 502: Display the virtual character, a first character part on the virtual character including a third clothes component and a multi-style component, and the multi-style component being displayed as a first style.

The multi-style component includes a clothes component or a body component with various display styles. When the multi-style component is a clothes component, the multi-style component includes at least one of a hair component, a glove component, a boot component, a top component, and a bottom component. When the multi-style component is a body component, the multi-style component includes at least one of a head component, a hand component, an arm component, a leg component, and a foot component.

For example, all display styles of the multi-style component have a common display part and a difference display part. The style of the common display part is exactly the same. The difference display part is a part in which clipping may exist with some clothes components. The difference display part is designed in different styles to match different clothes components, so as to avoid clipping.

Figure 11:
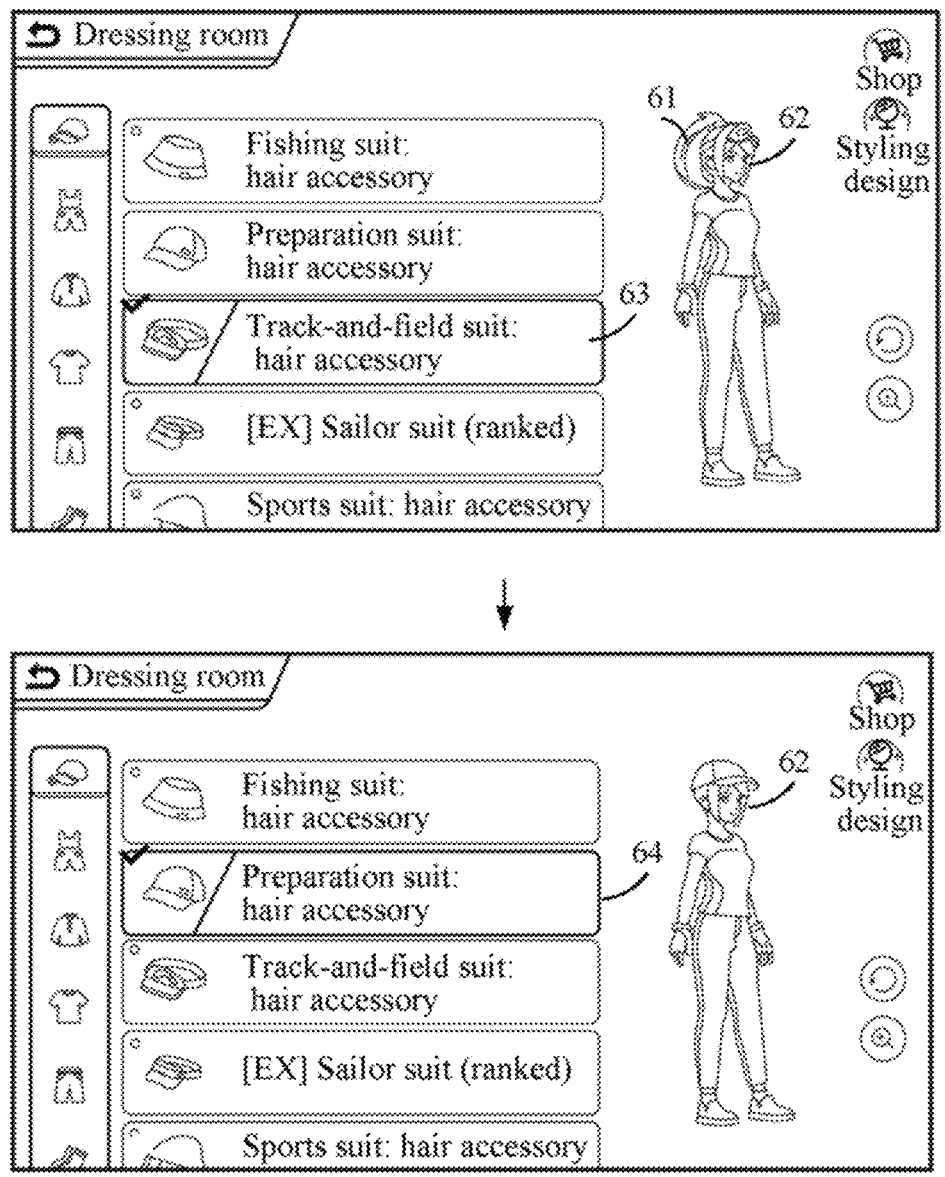
FIG. 11 is a schematic diagram of an interface of a method for displaying a virtual character according to an exemplary embodiment of the present disclosure.

For example, the multi-style component is a hime-cut hair component. As shown in FIG. 11, a first style of the hime-cut hair component includes a ponytail part 61 and an ear-side hair tail part 62. When the third clothes component is a visor 63, no model intersection exists between the hime-cut hair component and the third clothes component 63. That is, the ponytail part 61 can be exposed out of the visor.

In some embodiments, the third clothes component and the multi-style component are associated with each other. The third clothes component and the multi-style component associated with each other refers to that the third clothes component and the multi-style component are connected to each other, or the third clothes component is worn on the multi-style component, or the third clothes component is mounted on the multi-style component, or the third clothes component and the multi-style component are in contact with each other.

Step 504: Obtain a fourth clothes component in response to a clothes component replacement instruction, a model intersection existing between the fourth clothes component and the multi-style component of the first style.

The clothes component replacement operation is an operation used to trigger replacement of the third clothes component. In terms of triggering form, the clothes component replacement operation includes at least one of a touch operation, a pressure touch operation, a floating touch operation, a motion sensing operation, a gesture operation, an eye gaze operation, and a voice control operation. That is, the clothes component replacement operation may be triggered based on a clothes-related UI displayed on a touchscreen, or may be triggered by hardware such as a sensor, a camera, or a microphone.

The clothes component replacement operation may be an operation used to select the fourth clothes component, or may be an operation used to cancel wearing of the third clothes component.

In an example, in addition to the virtual character, the clothes-related UI also displays a plurality of candidate clothes components. The clothes component replacement operation includes a selection operation triggered on a candidate clothes component from a plurality of candidate clothes components on the clothes-related UI.

In response to a selection operation on candidate clothes components, the client obtains a selected clothes component as the fourth clothes component.

In another example, the third clothes component is an additional clothes component purchased or gifted by the user account except for a default clothes component. The clothes component replacement operation may be an operation of canceling wearing of the third clothes component. In response to a wearing cancel operation on the third clothes component, the client obtains a default clothes component as the fourth clothes component.

For example, the third clothes component and the fourth clothes component correspond to the same clothes part, for example, both the third clothes component and the fourth clothes component are tops, or both are bottoms.

Step 506: Update display to perform a clothes component replacement, the second character part of the virtual character including the fourth clothes component and the multi-style component, the multi-style component being displayed as a second style, and no model intersection existing between the fourth clothes component and the multi-style component of the second style.

When a model intersection exists between the fourth clothes component and the multi-style component of the first style, the client determines the second style from a plurality of candidate styles of the multi-style component; and updates the display to perform a clothes component replacement according to the fourth clothes component and the multi-style component of the second style.

For example, the multi-style component is a hime-cut hair component. As shown in FIG. 11, a first style of the hime-cut hair component includes a ponytail part 61 and an ear-side hair tail part 62. When the fourth clothes component 64 is a soft-top cap, a model intersection exists between the first style of the hime-cut hair component and the fourth clothes component. That is, the ponytail part 61 will be exposed out of the top of the soft-top cap, resulting in clipping.

Therefore, the client automatically selects a second style of the hime-cut hair component. The second style does not include the ponytail part 61 but includes the ear-side hair tail part 62, that is, only the ear-side hair tail part 62 is left exposed out of the soft-top cap.

In the foregoing examples, a hair component is used as the multi-style component for description, but the foregoing problems may also exist when the multi-style component is a clothes component. For example, the multi-style component is a trench coat component, an evening gown component, a tiger cape component, or the like. Details are not described.

For example, the third clothes component and the fourth clothes component are from different sets of clothes, that is, the third clothes component and the fourth clothes component are not from the same set of clothes.

Based on the above, in the method provided in this embodiment, various styles are provided for the multi-style component, so when changing different clothes components, if a model intersection exists between a newly replacing clothes component and the multi-style component of the first style, the multi-style component switches from the second style to the first style, which can ensure that there is no clipping between the multi-style component and the fourth clothes component.

The technical solutions of the present disclosure may be used in the process of clothes display when different sets of clothes components are combined and matched. The present disclosure provides three technical solutions to resolve three problems.

1. Default Replacement Solution

Technical problem: if the single first clothes component is canceled, a model without clothes maps or a blank model of the virtual character will be displayed, so it is only possible to switch between a plurality of clothes components.

In the embodiments of the present disclosure, a whole set of clothes is divided into different clothes components. Each body component is made with a default clothes component. When a player chooses to cancel wearing of the first clothes component, a missing part on the three-dimensional model of the virtual character will be replaced with the default clothes component.

2. Matching Replacement Solution

Technical problem: when the virtual character has a plurality of sets of clothes with different styles, each set of clothes includes at least two clothes components. When the first clothes component is replaced with a second clothes component in a different style, there will be a problem of clipping caused by matching of components in different sizes. For example, a pants component is spliced with a thigh component (note that the pants component is not worn on the thigh component, but is spliced up and down), resulting in excessively long legs of the virtual character.

In the embodiments of the present disclosure, the clothes component and the body component are divided into different types such as long, medium, and short according to the length. When a long type of clothes component is used, a short type of body component is used for proper matching.

3. Style Replacement Solution of Multi-Style Component

Technical problem: even the clothes component or the body component with the same length is matched with other components, there will also be clipping due to the display style. For example, when a high-ponytail hair is matched with a soft-top cap, the high-ponytail hair will be displayed out of the top of the cap, resulting in clipping.

In the embodiments of the present disclosure, various display styles are designed for the same clothes component or body component that is additionally affected. When this type of component is matched with other components, the affected first style will be replaced with the unaffected second style.

Figure 12:
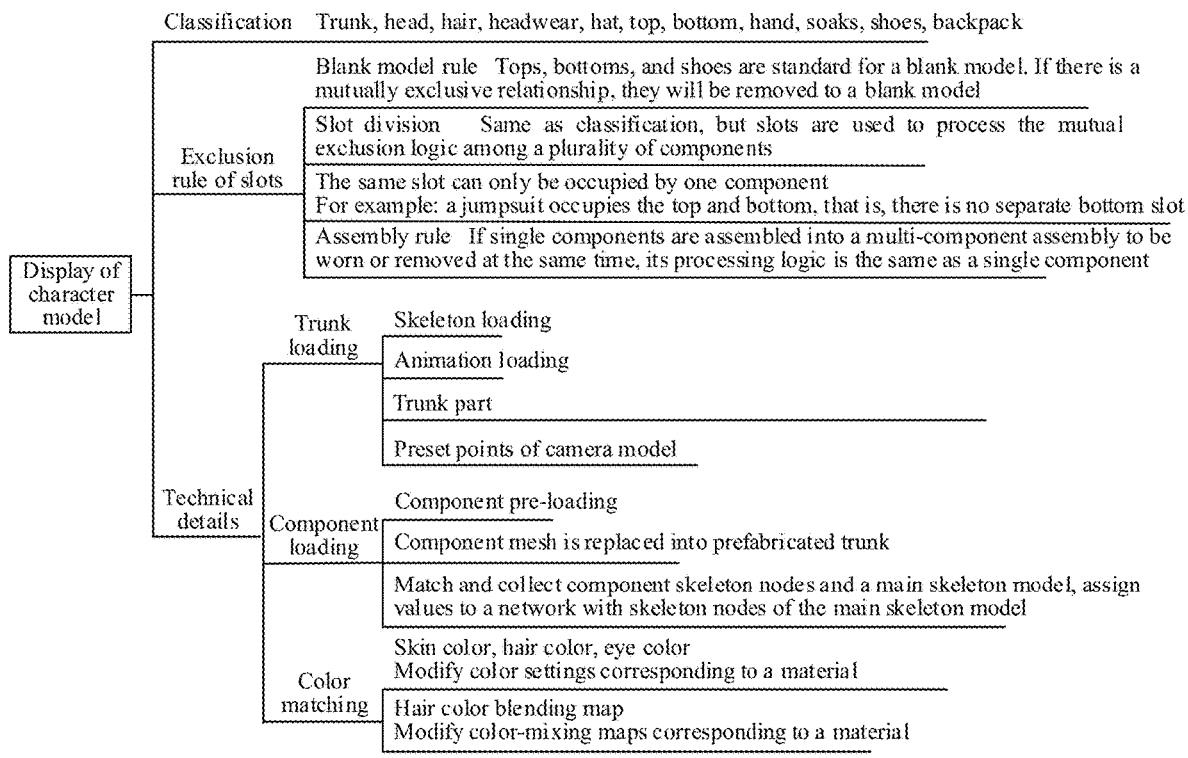
FIG. 12 is a schematic diagram of a method for displaying a virtual character according to another exemplary embodiment of the present disclosure.

In an exemplary example, as shown in FIG. 12, a display process of a three-dimensional model of a virtual character is as follows.

Model Resource:

The three-dimensional model of the virtual character includes a main skeleton model and a plurality of part models. For example, a set of main skeleton model and part models is set for a male character, and another set of main skeleton model and part models is set for a female character. The main skeleton model includes all skeleton nodes of the main skeleton and slots of all the parts. For example, in addition to a trunk part of the main skeleton model, the slots further include head slots, hair slots, headwear slots, hat slots, top slots, bottom slots, hand slots, socks (with exposed legs) slots, shoes slots, and backpack slots. All the slots have mesh controls mounted, but mesh data and material data of the mesh controls are initially empty. In some embodiments, the three-dimensional model further includes preset points of a camera model.

The component model will be associated with the corresponding referenced skeleton nodes and exported together. The skeleton nodes of the exported resources are generally the skeleton nodes on the main skeleton model, but other associated nodes on a non-main skeleton model are also allowed. These nodes will exist as a skeleton node assembly for mounting and unloading on the main skeleton model following the life cycle of the component. For example, a hair resource may exist in nodes on the non-main skeleton model to mount a dynamic skeleton script.

Model Configuration:

Each component model obtains information such as configuration name, model name, subordinate category, and occupied slot according to the component ID. The subordinate categories of the component model may be tops, bottoms, socks, and the like. There is a correspondence between the occupied slot and the subordinate category of the component model.

Model Loading and Assembly:

Every time a virtual character needs to be displayed, the corresponding configuration information of the component model is obtained according to the component ID to be loaded, and the mutual exclusion logic among different components is confirmed according to the occupied slot in the configuration information. For example, component A occupies two slots for top and bottom, and component B occupies a bottom slot. When the component A is replaced with the component B, the mesh of all slots of the component A will be unloaded. If default slots (tops, bottoms, and shoes) are empty after unloading, a blank model will be used for replacement.

Loading Logic:

According to a mutual exclusion rule of slots, the content of the components with a mutually exclusive relationship is filtered, and the information of the components that need to be loaded is collected.

The resources of the component model are loaded. After the resource loading of all component models completes the callback, the resource objects of the main skeleton model and each part model are instantiated. The mesh and material of the resource objects of the component model are assigned to the corresponding slots of the resource objects of the main skeleton model. If there is a new skeleton node, it is necessary to rebind the relationship between the component and the skeleton node, otherwise it will cause problems with the action of the virtual character.

For the model that has been loaded and combined, it is necessary to traverse the properties of the component model and modify the material color corresponding to the component model to control the skin color, eye color, and hair color.

Figure 13:
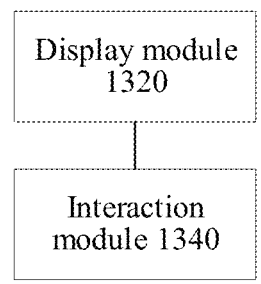
FIG. 13 is a block diagram of an apparatus for displaying a virtual character according to another exemplary embodiment of the present disclosure.

FIG. 13 is a block diagram of an apparatus for displaying a virtual character according to an exemplary embodiment of the present disclosure. The apparatus may be implemented as all or part of a client (or a terminal). The virtual character is a three-dimensional virtual character based on a three-dimensional model. The apparatus includes:

- a display module 1320, configured to display the virtual character, a first character part on the virtual character including a first clothes component and a first body component;
- an interaction module 1340, configured to obtain a second clothes component in response to a clothes component replacement instruction, the first clothes component and the second clothes component being corresponding to a same clothes part, and a length of the first clothes component being different from a length of the second clothes component; and
- the display module 1320, configured to update display to perform a clothes component replacement, the first character part on the virtual character including the second clothes component and a second body component that are associated with each other, and a length of the second body component being different from a length of the first body component, wherein a length of the first character part remains unchanged or changes by a value less than a threshold upon completion of the clothes component replacement.

In one embodiment of the present disclosure, the display module 1320 is configured to determine, when a length of the second clothes component is different from a length of the first clothes component, the second body component from a plurality of candidate body components of the first character part according to the length of the second clothes component and the length of the first character part; and update display to perform a clothes component replacement according to the second clothes component and the second body component.

In one embodiment of the present disclosure, the display module 1320 is configured to determine a difference between the length of the first character part and the length of the second clothes component; and determine the second body component having a length closest to the difference from the plurality of candidate body components of the first character part.

In one embodiment of the present disclosure, the first clothes component is a short-sleeve top component, the first body component is an upper arm component, the second clothes component is a long-sleeve top component, and the second body component is a forearm component; or, the first clothes component is a long-sleeve top component, the first body component is a forearm component, the second clothes component is a short-sleeve top component, and the second body component is an upper arm component; or, the first clothes component is a shorts or short skirt bottom component, the first body component is a thigh component, the second clothes component is a pants or long skirt component, and the second body component is a calf component; or, the first clothes component is a pants or long skirt component, the first body component is a calf component, the second clothes component is a shorts or short skirt bottom component, and the second body component is a thigh component.

In one embodiment of the present disclosure, the interaction module 1340 is configured to obtain, in response to a selection operation on candidate clothes components, a selected clothes component as the second clothes component.

In one embodiment of the present disclosure, the interaction module 1340 is configured to obtain, in response to a wearing cancel operation on the first clothes component, a default clothes component as the second clothes component.

In one embodiment of the present disclosure, a second character part of the virtual character includes a third clothes component and a multi-style component, and the multi-style component is displayed as a first style.

The interaction module 1340 is configured to obtain a fourth clothes component in response to a clothes component replacement instruction, a model intersection existing between the fourth clothes component and the multi-style component of the first style.

The display module 1320 is configured to update display to perform a clothes component replacement, the second character part of the virtual character including the fourth clothes component and the multi-style component that are associated with each other, the multi-style component being displayed as a second style, and no model intersection existing between the fourth clothes component and the multi-style component of the second style.

In one embodiment of the present disclosure, the display module 1320 is configured to determine, when a model intersection exists between the fourth clothes component and the multi-style component of the first style, the second style from a plurality of candidate styles of the multi-style component; and update display to perform a clothes component replacement according to the fourth clothes component and the multi-style component of the second style.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The apparatus for displaying a virtual character provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the apparatus for displaying a virtual character provided in the foregoing embodiments belongs to the same concept as the embodiments of the method for displaying a virtual character. For a specific implementation process of the apparatus, refer to the method embodiments. Details are not described herein again.

The present disclosure further provides a terminal. The terminal includes a processor and a memory. The memory stores at least one instruction. The at least one instruction is loaded and executed by the processor to implement the method for displaying a virtual character provided in the foregoing method embodiments. The terminal may be a terminal provided in FIG. 14 below.

Figure 14:
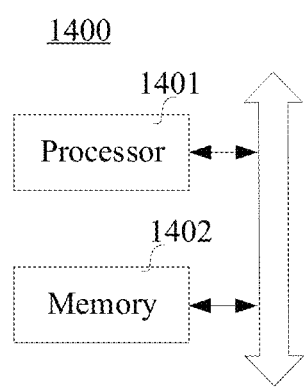
FIG. 14 is a block diagram of a terminal or a computer device according to another exemplary embodiment of the present disclosure.

FIG. 14 is a structural block diagram of a terminal 1400 according to an exemplary embodiment of the present disclosure. The terminal 1400 may be: a smartphone, a tablet computer, an MP3 player, an MP4 player, a notebook, or a desktop computer. The terminal 1400 may also be referred to as a user equipment, a portable terminal, a laptop terminal, a desktop terminal, or the like.

Generally, the terminal 1400 includes a processor 1401 and a memory 1402.

The processor 1401 may include one or more processing cores, for example, a 4-core processor or an 8-core processor. The processor 1401 may be implemented in at least one hardware form of digital signal processing (DSP), field-programmable gate array (FPGA), and programmable logic array (PLA). The processor 1401 may also include a main processor and a coprocessor. The main processor is configured to process data in an active state, also referred to as a central processing unit (CPU). The coprocessor is a low power consumption processor configured to process data in a standby state. In some embodiments, the processor 1401 may be integrated with a graphics processing unit (GPU). The GPU is configured to be responsible for rendering and drawing content that needs to be displayed by a display screen. In some embodiments, the processor 1401 may also include an artificial intelligence (AI) processor. The AI processor is configured to process a computing operation related to machine learning.

The memory 1402 may include one or more computer-readable storage media that may be non-transitory. The memory 1402 may also include a high-speed random access memory and a non-volatile memory, such as one or more magnetic disk storage devices or a flash storage device. In some embodiments, the non-transient computer-readable storage medium in the memory 1402 is configured to store at least one instruction, and the at least one instruction is used to be executed by the processor 1401 to implement the method for displaying a virtual character provided in the method embodiments of the present disclosure.

The memory further includes one or more programs. The one or more programs are stored in the memory. The one or more programs include a program for performing the method for displaying a virtual character provided in the embodiments of the present disclosure.

The present disclosure provides a computer-readable storage medium. The storage medium stores at least one instruction. The at least one instruction is loaded and executed by a processor to implement the method for displaying a virtual character according to the foregoing method embodiments.

The present disclosure further provides a computer program product or a computer program. The computer program product or the computer program includes a computer instruction, and the computer instruction is stored in a computer-readable storage medium. A processor of a computer device reads the computer instruction from the computer-readable storage medium, and executes the computer instruction, to cause the computer device to perform the method for displaying a virtual character provided in the foregoing optional implementations.

What is claimed is:

1. A method for displaying a three-dimensional (3D) virtual character based on a 3D model comprising:
   displaying the 3D virtual character, a first character part on the 3D virtual character comprising a first clothes component and a first body component concatenated end to end, wherein a length of the first character part is based on a total length of the first clothes component and the first body component;
   obtaining a second clothes component in response to a first clothes component replacement instruction, the first clothes component and the second clothes component being corresponding to a same clothes part, and a length of the first clothes component being different from a length of the second clothes component;
   determining, based on the length of the second clothes component and a length of the first character part, a second body component from a plurality of candidate body components corresponding to the first character part, wherein lengths of the candidate body components are different from each other, wherein the second body component is determined and retrieved separately after the second clothes component is obtained; and
   performing a first clothes component replacement and updating the first character part, the first character part on the 3D virtual character after the updating comprising the second clothes component and the second body component concatenated end to end, and a length of the second body component being different from a length of the first body component, wherein the length of the first character part remains unchanged or changes by a value less than a threshold upon completion of the first clothes component replacement.

2. The method according to claim 1, wherein the 3D model comprises a main skeleton model that includes slots for part models of clothes components, and performing the first clothes component replacement and updating the first character part comprises:
   in response to that the first clothes component occupies two slots and the second clothes component occupies a first slot of the two slots, and in response to the first clothes component replacement instruction, loading the first slot with the second clothes component and loading a second slot of the two slots with a default clothes component.

3. The method according to claim 1, wherein determining the second body component comprises:
   determining a difference between the length of the first character part and the length of the second clothes component; and
   determining, from the plurality of candidate body components of the first character part, the second body component having a length closest to the difference between the length of the first character part and the length of the second clothes component.

4. The method according to claim 1, wherein the first clothes component is a short-sleeve top component, the first body component is an upper arm component, the second clothes component is a long-sleeve top component, and the second body component is a forearm component; or
   the first clothes component is a long-sleeve top component, the first body component is a forearm component, the second clothes component is a short-sleeve top component, and the second body component is an upper arm component;

or
the first clothes component is a shorts or short skirt bottom component, the first body component is a thigh component, the second clothes component is a pants or long skirt component, and the second body component is a calf component;

or
the first clothes component is a pants or long skirt component, the first body component is a calf component, the second clothes component is a shorts or short skirt bottom component, and the second body component is a thigh component.

5. The method according to claim 1, wherein the obtaining the second clothes component in response to the first clothes component replacement instruction comprises:
in response to a selection operation on candidate clothes components, obtaining a selected clothes component as the second clothes component.

6. The method according to claim 1, wherein the obtaining the second clothes component in response to the first clothes component replacement instruction comprises:
in response to a wearing cancel operation on the first clothes component, obtaining a default clothes component as the second clothes component.

7. The method according to claim 1, wherein a second character part of the 3D virtual character comprises a third clothes component and a multi-style component that are associated with each other, the multi-style component is displayed as a first style, and the method further comprises:
obtaining a fourth clothes component in response to a second clothes component replacement instruction, a model intersection existing between the fourth clothes component and the multi-style component of the first style; and
performing a second clothes component replacement and updating the second character part, the second character part of the 3D virtual character comprising the fourth clothes component and the multi-style component, the multi-style component being displayed as a second style, and no model intersection existing between the fourth clothes component and the multi-style component of the second style.

8. The method according to claim 7, wherein performing the second clothes component replacement comprises:
when the model intersection exists between the fourth clothes component and the multi-style component of the first style, determining the second style from a plurality of candidate styles of the multi-style component; and
performing the second clothes component replacement according to the fourth clothes component and the multi-style component of the second style.

9. An apparatus for displaying a three-dimensional (3D) virtual character based on a 3D model, comprising: a processor and a memory, the memory storing at least one instruction, at least one program, a code set, or an instruction set, the at least one instruction, the at least one program, the code set, or the instruction set being loaded and executed by the processor to:
display the 3D virtual character, a first character part on the 3D virtual character comprising a first clothes component and a first body component concatenated end to end, wherein a length of the first character part is based on a total length of the first clothes component and the first body component;
obtain a second clothes component in response to a first clothes component replacement instruction, the first clothes component and the second clothes component being corresponding to a same clothes part, and a length of the first clothes component being different from a length of the second clothes component;
determine, based on the length of the second clothes component and a length of the first character part, a second body component from a plurality of candidate body components corresponding to the first character part, wherein lengths of the candidate body components are different from each other, wherein the second body component is determined and retrieved separately after the second clothes component is obtained; and
perform a first clothes component replacement and update the first character part, the first character part on the 3D virtual character after the updating comprising the second clothes component and the second body component concatenated end to end, and a length of the second body component being different from a length of the first body component, wherein the length of the first character part remains unchanged or changes by a value less than a threshold upon completion of the first clothes component replacement.

10. The apparatus according to claim 9, wherein the processor is further configured to;
determine a difference between the length of the first character part and the length of the second clothes component; and
determine, from the plurality of candidate body components of the first character part, the second body component having a length closest to the difference between the length of the first character part and the length of the second clothes component.

11. The apparatus according to claim 10, wherein
the first clothes component is a short-sleeve top component, the first body component is an upper arm component, the second clothes component is a long-sleeve top component, and the second body component is a forearm component.

12. The apparatus according to claim 10, wherein the first clothes component is a long-sleeve top component, the first body component is a forearm component, the second clothes component is a short-sleeve top component, and the second body component is an upper arm component.

13. The apparatus according to claim 10, wherein the first clothes component is a shorts or short skirt bottom component, the first body component is a thigh component, the second clothes component is a pants or long skirt component, and the second body component is a calf component.

14. The apparatus according to claim 10, wherein the first clothes component is a pants or long skirt component, the first body component is a calf component, the second clothes component is a shorts or short skirt bottom component, and the second body component is a thigh component.

15. The apparatus according to claim 9, wherein the processor is further configured to obtain, in response to a selection operation on candidate clothes components, a selected clothes component as the second clothes component.

16. The apparatus according to claim 9, wherein the processor is further configured to obtain, in response to a wearing cancel operation on the first clothes component, a default clothes component as the second clothes component.

17. A non-transitory computer-readable storage medium, storing at least one instruction, at least one program, a code set, or an instruction set, the at least one instruction, the at least one program, the code set, or the instruction set being loaded and executed by a processor to implement:

displaying a three-dimensional (3D) virtual character, a first character part on the 3D virtual character comprising a first clothes component and a first body component concatenated end to end, wherein a length of the first character part is based on a total length of the first clothes component and the first body component;

obtaining a second clothes component in response to a first clothes component replacement instruction, the first clothes component and the second clothes component being corresponding to a same clothes part, and a length of the first clothes component being different from a length of the second clothes component;

determining, based on the length of the second clothes component and a length of the first character part, a second body component from a plurality of candidate body components corresponding to the first character part, wherein lengths of the candidate body components are different from each other, wherein the second body component is determined and retrieved separately after the second clothes component is obtained; and performing a first clothes component replacement and updating the first character part, the first character part on the 3D virtual character after the updating comprising the second clothes component and the second body component concatenated end to end, and a length of the second body component being different from a length of the first body component, wherein the length of the first character part remains unchanged or changes by a value less than a threshold upon completion of the first clothes component replacement.

18. The non-transitory computer-readable storage medium according to claim 17, wherein the 3D model comprises a main skeleton model that includes slots for part models of clothes components, and performing the first clothes component replacement and updating the first character part comprises:

in response to that the first clothes component occupies two slots and the second clothes component occupies a first slot of the two slots, and in response to the first clothes component replacement instruction, loading the first slot with the second clothes component and loading a second slot of the two slots with a default clothes component.

19. The non-transitory computer-readable storage medium according to claim 17, wherein the determining the second body component comprises:

determining a difference between the length of the first character part and the length of the second clothes component; and determining, from the plurality of candidate body components of the first character part, the second body component having a length closest to the difference between the length of the first character part and the length of the second clothes component.

20. The non-transitory computer-readable storage medium according to claim 17, wherein a second character part of the 3D virtual character comprises a third clothes component and a multi-style component that are associated with each other, the multi-style component is displayed as a first style, and the processor is further caused to implement:

obtaining a fourth clothes component in response to a second clothes component replacement instruction, a model intersection existing between the fourth clothes component and the multi-style component of the first style; and performing a second clothes component replacement and updating the second character part, the second character part of the 3D virtual character comprising the fourth clothes component and the multi-style component, the multi-style component being displayed as a second style, and no model intersection existing between the fourth clothes component and the multi-style component of the second style.

* * * * *